United States Patent [19]

O'Brien et al.

[11] 3,965,028

[45] June 22, 1976

[54] BISULFITE TERMINATED OLIGOMERS TO PREVENT SCALE

[75] Inventors: John T. O'Brien, Cheshire; Woodrow W. White, Oxford, both of Conn.

[73] Assignee: Uniroyal Inc., New York, N.Y.

[22] Filed: July 31, 1974

[21] Appl. No.: 493,489

[52] U.S. Cl. ............................... 252/180; 210/58; 252/8.55 B; 252/181
[51] Int. Cl.² ......................................... C02B 5/06
[58] Field of Search .............. 252/8.55 B, 180, 181, 252/82, 87; 210/58

[56] References Cited
UNITED STATES PATENTS

| | | |
|---|---|---|
| 2,783,200 | 2/1957 | Crum et al. .................. 252/181 X |
| 3,492,240 | 1/1970 | Hettinger ........................ 252/180 |
| 3,514,376 | 5/1970 | Salutsky ....................... 210/58 X |
| 3,623,991 | 11/1971 | Sabatelli et al. .................. 252/180 |
| 3,646,099 | 2/1972 | Dannals ........................ 260/465.4 |

*Primary Examiner*—Herbert B. Guynn
*Attorney, Agent, or Firm*—Bruce F. Jacobs

[57] ABSTRACT

Scale formation in industrial waters, such as cooling water, is inhibited by adding a bisulfite terminated oligomer such as sodium bisulfite-terminated acrylic acid-acrylonitrile oligomer.

10 Claims, No Drawings

BISULFITE TERMINATED OLIGOMERS TO PREVENT SCALE

This invention relates to a method of treating water to inhibit scale formation, using a bisulfiteterminated oligomer.

Representative teachings relating to treatment of water or to dispersants in aqueous systems are contained in U.S. Pat. Nos. 3,080,264, 3,085,916, 3,419,502, 3,492,240, 3,524,682, 3,549,548, 3,620,667, 3,663,448 and 3,746,641, Canadian Pat. Nos. 775,525 and 815,087, French Pat. Nos. 1,449,131 and 1,449,184 and German Pat. No. 1,719,432. Bisulfite-terminated oligomers of the kind employed in the present invention are disclosed in U.S. Pat. No. 3,646,099, Dannals, Feb. 29, 1972.

Typically, industrial water contains alkaline earth metal or transition metal cations, like calcium, barium, magnesium, iron, etc. and such anions as bicarbonate, carbonate, sulfate, oxalate, phosphate, silicate, fluoride, etc. If the concentrations of combinations of these ions are so high that the solubility of their reaction products is exceeded, precipitation occurs until equilibrium is reached. The point of equilibrium is defined in the art by the solubility product. The concentration of these scale forming materials increases by such mechanisms as partial evaporation of the water, changes in pH, pressure, or temperature, and introduction of water of different ion coposition. The amount of scaling depends upon the amount and type of dissolved species, temperature and pH.

The scale deposits are hard, dense coatings comprising the above recited inorganic materials principally formed by precipitation of dissolved solids. Corrosion, fouling and accumulation of dirt and sediment usually contribute to the deposits. The scale prevents effective heat transfer, interferes with fluid flow, facilitates corrosion and harbors bacteria. Both boiler and cooling water are subject to the problem of scale formation. Besides lessening operational efficiency, scale causes costly delays and shutdowns for cleaning and removal. Also in boilers, the reduced heat exchange tends to produce overheating of the metal which in turn can and does lead to rupture of the boiler exchange surfaces.

While scale-formation can be prevented by complexing the cations with chelating or sequestering agents, generally, this takes place at levels of sequestrants of several time greater than the concentration of cation depending upon the anion present. The use of polyphosphates at levels far below those needed for sequestration or chelation has been known to inhibit scale effectively. These lower concentrations termed threshold levels amount to less than the concentration of cation.

The use of polyacrylate and polymethacrylate salts as scale inhibitors and sequestrants is known. They can be combined with conventional chelating agents such as EDTA (ethylene diamine tetraacetic acid) or NTA (nitrilo triacetic acid). The effective synthetic water soluble polymers include sodium polyacrylate or hydrolyzed polyacrylonitrile, polymethacrylic acid and its salts, polyamines and polyacrylamides. The effective anionic polymers have relatively low molecular weights. They have been observed to inhibit precipitation of calcium salts and to change the scale deposits to smaller irregularly shaped crystals which seem to be easier to disperse and control.

Another application for which scale inhibitors have proven useful is injection of brine used in secondary recovery in oil fields. Currently, about three barrels of brine are pumped out with each barrel of oil produced in the United States. The scale forming materials in the brine will precipitate onto the metal surfaces in the well bore interfering with the productivity of the well. Also when heat is applied to separate the oil and brine phases, substantial precipitation occurs unless controls are used. While the inhibitor is most frequently added in the oil/water separation equipment before the water is returned to the earth, it can be added at any point during the production process, starting at the bottom of the well bore.

The present invention affords a remarkably advantageous method of treating water containing scaleforming ingredients by adding to the water, in amount effective to inhibit formation of scale, water soluble a bisulfite-terminated oligomer having the formula

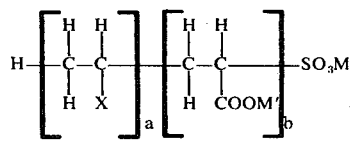

where M is a water soluble cation, particularly an alkali metal [e.g., sodium or potassium] or ammonium; X is selected from —CN and —COOCH$_3$; M' is selected from ammonium, amine (e.g. methylamine, ethylamine), and alkali metal (e.g., sodium, potassium) group; the subscript "a" indicates the total moles of -X group on the average per molecule and "b" the total moles of COOM' on the average per molecule. The degree of polymerization, $a + b$, ranges broadly from about 4 to 250, and most preferably from 6 to 150. The mole fraction of the -X group as indicated by the ratio, $a/(a+b)$, is broadly from about 0.0 to not greater than 0.5, preferably 0.0 to 0.4, and most preferably 0.0 to 0.10. It will be understood that the formula is not intended to depict the actual structure of the oligomers because the structural units are randomly distributed throughout the molecule.

The oligomers employed in this invention are produced by the polymerization of acrylic acid alone or with acrylonitrile or methyl acrylate in water and in the presence of alkali metal bisulfite such that the amounts of each species correspond to the desired levels of a and b in the product. The oligomers so prepared are then neutralized with common bases, e.g., NaOH, KOH, NH$_3$, etc. Further details of the preparation of oligomers useful in this invention are in U.S. Pat. No. 3,646,099 referred to above and incorporated by reference herein.

In accordance with the invention these oligomers have surprisingly proved useful for inhibiting the precipitation of scale-forming materials from water. They are applicable to systems of industrial water including boiler and cooling water, to oil field waters and brine, to swimming pools, and other waters. While the oligomers are effective alone for inhibition of scale formation, their use in combination with sequestrants including EDTA, NTA, polyphosphates and organo phosphorous compounds is also within the scope of the invention. The combinations of ingredients with the oligomers frequently yields greater effectiveness than the additive effect of the individual components. The oligomers are useful in treatment of both once-through and open or closed recirculating industrial water systems. The invention is not limited to the treatment of such systems, but may be used in conjunction with a wide variety of industrial processes which use hard water. In particular, the present oligomers may be used to prevent scale deposits in effluent and disposal waters where other materials which might be used would constitute a pollution problem. While the exact mechanism of activity is not fully understood, the treatment may be distorting growth of crystal latices of scale forming materials. As a result, the materials which include calcium carbonate, calcium phosphate, calcium sulfate, barium sulfate, magnesium carbonate, magnesium phosphate, iron oxide or hydroxide, etc. are kept dispersed or soluble so that visible precipitation is inhibited. Not only are the oligomers useful for inhibiting scale formation, but they also greatly reduced the rate of deposition and sedimentation of iron oxides, clays, and other insoluble materials through dispersing action. It is well known that dispersants of insoluble material in water are not necessarily anti-scaling agents.

The oligomers of the invention are effective at very low dosages. While the results depend upon the amount of scale-forming materials, pH, and temperature, the oligomers are generally useful from 0.1 to 300 ppm and more preferably from 0.5 to 30 ppm. The typical preparation of the oligomers and the illustration of their utility are embodied in the following examples.

EXAMPLE 1

A typical laboratory preparation of an oligomer of the invention wherein X is —CN, M and M' are both sodium, a + b is 15.5, and a/a + b is 0.35, was as follows:

The following materials are combined in a 1 liter resin flask:

| | | |
|---|---|---|
| 280 | ml | water |
| 16.4 | ml | sodium bisulfite |
| | | (9.2 phm, 0.088 moles) |
| 110 | ml | (115.5 g) acrylic acid |
| | | (65.1 phm, 0.904 moles) |
| 57 | ml | (45.6 g) acrylonitrile |
| | | (25.7 phm, 0.485 moles) |

The mixture is equilibrated under agitation in a water bath controlled at 30°C., while nitrogen is allowed to flow through the reactor. Ammonium persulfate, 10% solution, is added incrementally from a burette using 0.25 ml aliquots every hour for two hours and again at 2½ hours (a total of 1 ml), when no further exotherm could be detected from the temperature of the reaction. The maximum temperature reached during polymerization is 33.6°C.

The Brookfield viscosity (RVT) of the solution is 600 mPa.s (cp) at 38.9% total solids. The solution is neutralized to pH 11.5 with 115.0 g of about 50% sodium hydroxide. The neutralized oligomer solution has a Brookfield viscosity of 330 mPa.s and total solids of 39.2%. A one gram portion of the reaction product was converted to its methyl ester in a boron trifluoridemethanol mixture, and the average molecular weight determined to be about 1150 by vapor pressure. A portion of about 200 ml of the reaction product was also diluted to a 25.0% wt. wolution of oligomer to serve as a concentrated solution of the scale inhibitor; this solution was diluted further for use in the examples below.

The oligomer obtained as an aqueous solution as the reaction product from the polymerization may be used as an additive for inhibition of scale-formation without further purification or removal of traces of catalyst and monomer residues. The reaction solids during polymerization are not critical as far as the utility of the oligomers is concerned. Also, the solids of the reaction product may be adjusted to any concentration to produce the solution of the oligomer which is used as the scale inhibitor. This concentrated solution of oligomer may contain any level of oligomer solids generally not exceeding 60%, and may be as low as 100 ppm, although this concentration does not affect the utility of the oligomer. The oligomer may be recovered from the reaction mixture by any suitable means such as spray drying and used as a solid additive in place of the concentrated solution of oligomer.

EXAMPLE 2

To one liter of distilled water, at 22°C., there is added 8 ml of 0.20 M calcium chloride solution, 6 ml of 0.20 M sodium bicarbonate solution and 2 ml of 0.20 M sodium carbonate solution. The resulting aqueous solution contains an amount of calcium ion equivalent to 160 ppm of calcium carbonate; the pH is 8.0 and the mole fraction of bicarbonate ion of total carbonate content is 0.75. The solution is observed, to determine how much time elapses before the onset of turbidity. In this case, turbidity appears within 9 minutes of mixing the solution. The foregoing experiment is repeated, but in addition 7 ml of a 0.1% solution of the oligomer of Example 1 is added when the solution is prepared to provide 7 ppm of oligomer in the solution. In this case, the time before onset of turbidity is greater than 24 hours. Table I lists the results of the foregoing two experiments (as Runs 20 and 22 respectively in Part B) as well as the results of a number of similarly conducted experiments. In one series of experiments, listed as Runs 1 to 13 in Part A of Table I, the type of oligomer employed is varied while keeping the concentration of calcium ions constant at a level equivalent to 200 ppm of calcium carbonate, and the concentration of oligomer constant at 5 ppm. Run 14 of Part A, TABLE I, is a control using no oligomer. In another series of experiments, listed as Runs 15 to 30 in Part B of Table I, the oligomer of Example 1 is employed at concentrations ranging from 0 to 25 ppm while the concentration of calcium ions is varied from levels equivalent to from 100 to 1000 ppm of calcium carbonate. These experiments clearly demonstrate the ability of the present bisulfite terminated oligomers to inhibit precipitation of insoluble salt (scaling) from water containing such salt in a concentration in excess of the solubility of the salt.

TABLE I

PART A
Oligomers as Anti-Scaling Agents (1)

| | Oligomer | | Time before onset |
|---|---|---|---|
| Run No. | a+b | a/a+b | of turbidity |
| 1 | 13.9 | 0.0 | >24 hrs. |
| 2 | 9.7 | 0.0 | >24 " |
| 3 | 10.0 | 0.03 | >24 " |
| 4 | 9.0 | .09 | >24 " |
| 5 | 6.0 | .10 | 15 " |
| 6 | 12.3 | .17 | 3 " |
| 7 | 8.6 | .18 | 10 " |
| 8 | 33.6 | .18 | 4 " |
| 9 | 154. | .23 | 4 " |
| 10 | 50.6 | .31 | 45 min. |
| 11 | 10.5 | .35 | 15 " |

TABLE I-continued

PART A
Oligomers as Anti-Scaling Agents (1)

| Run No. | Oligomer a+b | a/a+b | Time before onset of turbidity |
|---|---|---|---|
| 12 | 15.5 | .35 | 12 " |
| 13 | 31.3 | .45 | 7 " |
| 14 | — | — | 1 " |

(1)
- Calcium Ion Concentration (initial): $2 \times 10^{-3}$ M
- Carbonate Ion Concentration (initial): $10^{-3}$ M
- Bicarbonate Ion Concentration (initial): $10^{-3}$ M
- Product of Calcium and Carbonate Ions: $2 \times 10^{-6}$ M$^2$
- Oligomer Concentration (Runs 1–13): 5 ppm
- pH: 8.5

TABLE I

PART B
Effect of Calcium Ion Concentration (2)

| Run No. | Initial Ca$^{++}$ Concentration | Hardness CaCO$_3$ ppm | Oligomer Concentration | pH | Initial HCO$_3^-$ Concentration (3) | Initial CO$_3^=$ Concentration (3) | Product of Initial Ca$^{++}$ and CO$_3^=$ | Time before onset of turbidity |
|---|---|---|---|---|---|---|---|---|
| 15 | $10^{-3}$ | 100 | 0 | 9.7 | $0.3 \times 10^{-3}$ | $0.7 \times 10^{-3}$ | $7 \times 10^{-7}$ | 4 min. |
| 16 | $10^{-3}$ | 100 | 5 | 9.7 | $0.3 \times 10^{-3}$ | $0.7 \times 10^{-3}$ | $7 \times 10^{-7}$ | 2 hrs. |
| 17 | $10^{-3}$ | 100 | 25 | 9.7 | $0.3 \times 10^{-3}$ | $0.7 \times 10^{-3}$ | $7 \times 10^{-7}$ | 12 hrs. |
| 18 | $1.2 \times 10^{-3}$ | 120 | 0 | 8.5 | $0.7 \times 10^{-3}$ | $0.5 \times 10^{-3}$ | $6 \times 10^{-7}$ | 1 min. |
| 19 | $1.2 \times 10^{-3}$ | 120 | 5 | 8.5 | $0.7 \times 10^{-3}$ | $0.5 \times 10^{-3}$ | $6 \times 10^{-7}$ | 9 hrs. |
| 20 | $1.6 \times 10^{-3}$ | 160 | 0 | 8.0 | $1.2 \times 10^{-3}$ | $0.4 \times 10^{-3}$ | $6.4 \times 10^{-7}$ | 9 min. |
| 21 | $1.6 \times 10^{-3}$ | 160 | 3 | 8.0 | $1.2 \times 10^{-3}$ | $0.4 \times 10^{-3}$ | $6.4 \times 10^{-7}$ | 15 hrs. |
| 22 | $1.6 \times 10^{-3}$ | 160 | 7 | 8.0 | $1.2 \times 10^{-3}$ | $0.4 \times 10^{-3}$ | $6.4 \times 10^{-7}$ | >24 hrs. |
| 23 | $2 \times 10^{-3}$ | 200 | 0 | 7.7 | $2 \times 10^{-3}$ | (5) | $4.4 \times 10^{-8}$ (4) | >24 hrs. |
| 24 | $2 \times 10^{-3}$ | 200 | 5 | 7.7 | $2 \times 10^{-3}$ | (5) | $4.4 \times 10^{-8}$ (4) | >24 hrs. |
| 25 | $2.4 \times 10^{-3}$ | 240 | 0 | 8.0 | $1.8 \times 10^{-3}$ | $0.6 \times 10^{-3}$ | $1.44 \times 10^{-6}$ | 3.5 min. |
| 26 | $2.4 \times 10^{-3}$ | 240 | 3 | 8.0 | $1.8 \times 10^{-3}$ | $0.6 \times 10^{-3}$ | $1.44 \times 10^{-6}$ | 1 hr. |
| 27 | $2.4 \times 10^{-3}$ | 240 | 7 | 8.0 | $1.8 \times 10^{-3}$ | $0.6 \times 10^{-3}$ | $1.44 \times 10^{-6}$ | 10 hrs. |
| 28 | $10^{-2}$ | 1000 | 0 | 7.7 | $10^{-2}$ | (5) | $1.1 \times 10^{-6}$ (4) | 1 min. |
| 29 | $10^{-2}$ | 1000 | 5 | 7.7 | $10^{-2}$ | (5) | $1.1 \times 10^{-6}$ (4) | 12 hrs. |
| 30 | $10^{-2}$ | 1000 | 25 | 7.7 | $10^{-2}$ | (5) | $1.1 \times 10^{-6}$ (4) | >24 hrs. |

(2) Oligomer of Example 1, varying concentration and pH
(3) Calculated from ionization constants of CO$_3^=$
(4) Calculate, based on footnote (5)
(5) Approximately 0.011 time HCO$_3^-$ concentration

EXAMPLE 3

To demonstrate further the inhibition of scale, two solutions were subjected to the following test:

Solutions were made up containing both $2 \times 10^{-3}$ M CaCl$_2$ and $2 \times 10^{-3}$ M NaHCO$_3$, affording solutions of pH 7.7. The first solution had been treated with 5 ppm (5 ml 0.1%) oligomer of Example 1; the second contained no inhibitor. The solutions were heated to 200°F. simultaneously, and were kept at the temperature for one hour but were not allowed to boil. The volume of liquid was kept nearly constant by covering the beakers with a watch glass, and distilled water was added as make-up when needed. In the absence of oligomer, the solution became turbid during the warm-up when the temperature reached 178°F. After 9 more minutes, with the temperature at 191°F., extensive precipitation had taken place and the typical calcium carbonate deposit on the bottom of the beaker was observed. The treated sample containing 5 ppm of oligomer showed no precipitation throughout the heating cycle. At the end of the hour the solutions were allowed to cool. When the temperature had fallen below 30°C., the solutions were poured out, and the beakers were rinsed thoroughly with distilled water. When a few milliliters of dilute hydrochloric acid were added to the bottom of the beaker which had contained the solution treated with oligomer, no evolution of carbon dioxide was observed. By contrast, the beaker which had contained the untreated solution showed extensive release of carbon dioxide.

EXAMPLE 4

This example illustrates practice of the invention with a boiler feed water having the following composition:

| | |
|---|---|
| pH | 6.3 |
| HCO$_3^-$ | 2 ppm |
| Cl$^-$ | 9 ppm |
| SiO$_2$ | 8 ppm |
| NO$_3$ | 5 ppm |
| Hardness (CaCO$_3$) | 14 ppm |

To inhibit scale formation 10 ppm of a bisulfite terminated oligomer of the formula stated above is added wherein M is potassium, X is —COOCH$_3$, M' is ammonium, a + b is 123 and a/a + b is 0.12. The inhibitor enables scale free operation resulting in good heat transfer efficiency to be maintained for a longer period than would otherwise be possible and prolongs the time the boiler can be operated without a shut-down to clean the boiler tubes.

EXAMPLE 5

A recirculating cooling water has the following composition:

| | |
|---|---|
| Total hardness | 400 ppm |
| Calcium hardness | 240 ppm |
| Magnesium hardness | 160 ppm |
| Total alkalinity | 250 ppm |
| Sodium Chloride | 400 ppm |
| Sodium Sulfate | 1500 ppm |
| pH | ca.8 |

As a scale inhibitor, 25 ppm of a bisulfite terminated oligomer is added, having the formula stated above wherein M is sodium, X is —COOCH$_3$, M' is ethylamino, a + b is 20.2 and a/a+b is 0.18.

EXAMPLE 6

15 ppm of an oligomer of the above formula wherein M is potassium, X is —CN, M' is methylamino, a + b is 250 and a/a+b is 0.30, is added to brine as a scale inhibitor.

We claim:

1. A method of treating water to inhibit scale formation on surfaces of equipment in which the water is used comprising adding to the water, in an amount effective to inhibit scale formation, a bisulfite-terminated oligomer having the formula

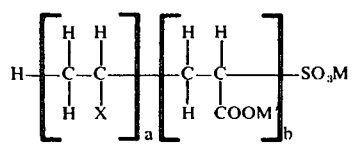

wherein M is a water soluble cation; X is selected from the group consisting of —CN and —COOCH$_3$; M' is selected from the group consisting of ammonium, amine, and alkali metal; $a + b$ is from 4 to 250; and $a/a+b$ is from 0.0 to 0.5.

2. The method of claim 1 wherein $a + b$ is from 6 to 150.

3. The method of claim 1 wherein $a/a+b$ is from 0.0 to 0.4.

4. The method of claim 1 wherein $a/a+b$ is from 0.0 to 0.1.

5. The method of claim 1 wherein the water being treated is selected from the group consisting of boiler feed water, recirculating cooling water, and brine.

6. The method of claim 1 wherein M is selected from the group consisting of sodium and potassium.

7. The method of claim 1 wherein X is —CN.

8. The method of claim 1 wherein X is —COOCH$_3$.

9. The methos of claim 1 wherein M' is selected from the group consisting of ammonium, methylamino, ethylamino, sodium, and potassium.

10. The method of claim 1 wherein the oligomer is used in 0.1 to 300 parts per million parts of water to be treated.

* * * * *

UNITED STATES PATENT AND TRADEMARK OFFICE
CERTIFICATE OF CORRECTION

PATENT NO. : 3,965,028
DATED : June 22, 1976
INVENTOR(S) : John T. O'Brien et al.

It is certified that error appears in the above-identified patent and that said Letters Patent are hereby corrected as shown below:

Claim 1, line 4, after "a" insert --water soluble --.

Signed and Sealed this

Fifth Day of October 1976

[SEAL]

Attest:

RUTH C. MASON
*Attesting Officer*

C. MARSHALL DANN
*Commissioner of Patents and Trademarks*